United States Patent [19]
Bywalez

[11] Patent Number: 5,942,291
[45] Date of Patent: Aug. 24, 1999

[54] PROCESS FOR PROTECTING ROLLER BEARINGS AGAINST CORROSION

[75] Inventor: Karl Bywalez, Schweinfurt, Germany

[73] Assignee: FAG Automobiltechnik AG, Germany

[21] Appl. No.: 08/976,849

[22] Filed: Nov. 24, 1997

[30] Foreign Application Priority Data

Nov. 23, 1996 [DE] Germany .......................... 196 48 577

[51] Int. Cl.$^6$ ..................................................... H05B 6/02
[52] U.S. Cl. .......................... 427/591; 427/190; 427/191; 427/192; 427/383.3; 427/427
[58] Field of Search .................................... 427/591, 190, 427/191, 192, 383.3, 427

[56] References Cited

U.S. PATENT DOCUMENTS 5,161,898  11/1992  Drake ......................................... 384/95

FOREIGN PATENT DOCUMENTS 4142313   6/1993   Germany .

*Primary Examiner*—Bernard Pianalto
*Attorney, Agent, or Firm*—Ostrolenk, Faber, Gerb & Soffen, LLP

[57] ABSTRACT

A process for protecting the surface of a roller bearing against corrosion. The roller bearing is provided with a thin protective coating of a powdered coating material or of a wet coating material and then the bearing is inductively heated, at the coated surface thereof, in the range of 200° C. to 300° C. for a few seconds to cure the coating material. The bearing is thereafter cooled. The wet coating material is based on inorganic substances and is electrically conductive.

12 Claims, No Drawings

PROCESS FOR PROTECTING ROLLER BEARINGS AGAINST CORROSION

BACKGROUND OF THE INVENTION

The invention relates to a process for protecting roller bearings against corrosion, involving coating the surface and curing the coating on the bearings.

Roller bearings and their surrounding parts are often employed in an environment in which they are exposed to aggressive media. For example, the wheel bearings of motor vehicles are subjected in winter to aggressive stress from water spray and from grit, which leads to severe rust formation and may reduce the service life of the bearing. Although some roller bearings are made from stainless steel, those are too expensive for many applications.

DE 41 42 313 A1 discloses a roller bearing which is provided with an anticorrosion coating of a zinc alloy. The protective coating is applied by electroplating, before the bearing is assembled and before it is installed in its surrounding part. Consequently, that part must likewise be coated. The electroplated coating is not only laborious and expensive to apply, but the coating gives rise to environmental problems and also adversely affects the steel microstructure of the roller bearing through hydrogen embrittlement.

Coating with powder or wet coating materials, for protecting a wide variety of products against corrosion is likewise known in the art. In this case, the parts are sprayed with or immersed in the coating material, and the material is subsequently cured fully or it is baked in a hot oven. Dependent upon the product, the oven temperature is 200° C. or more. For ready mounted and greased roller bearings provided with a seal, however, heat treatment of this kind is unsuitable, since there is a concern that the seals and the grease will be damaged in the process and that microstructural changes will occur in the roller bearing steel.

Finally, WO 93/24242 discloses a powder coating process in which the workpiece is heated by an inductor and the inductively heated workpiece is then sprayed with a coating powder, which is melted on. This process gives an anodic protective coat which is not electrically conductive and which is sensitive to subsequent scratches in the surface, causing rust creep. For reasons set out above, this process is likewise regarded as unsuitable for roller bearings.

SUMMARY OF THE INVENTION

The object of the invention, therefore, is to provide a process for protecting roller bearings against corrosion and which makes it possible to treat, in a cost effective and reliable manner, the finished, greased and sealed roller bearings with or without their surrounding parts. At the same time it should be possible to employ the process in a production line having short cycle times.

The process of the invention is particularly for protecting roller bearings and/or the surrounding parts of the bearings against corrosion. The bearings or their parts have been machine finished, are provided with grease and/or seals and/or are installed in the surrounding part. Then they are provided with a thin protective coat of a powdered coating material or of a wet coating material. Then they are inductively heated at an appropriate curing temperature for the material for a few seconds and are thereafter are cooled.

DESCRIPTION OF THE PREFERRED EMBODIMENT

The invention is illustrated by reference to a working example. A roller bearing which has been machine finished, has been provided with grease and seals and is installed in a surrounding part, particularly on a wheel flange, e.g. for a motor vehicle wheel bearing. The highly corrosion stressable areas are coated partially by spraying them with a wet coating material based on inorganic substances and which is electrically conductive (e.g. DELTA-TONE 9000 from Ewald Dörken AG, D-58313 Herdecke, Germany), having a high zinc content.

Then inductive heating is performed partially at these areas, and near the surfaces, preferably in a temperature range of 200° to 300° C. for a few seconds to cure the coating material. The bearing is subsequently cooled.

The spray units for the coating, as well as the induction and cooling apparatus, are integrated into the production line. Therefore, the finished bearing units may be subsequently packed directly in the packaging line and are ready for dispatch.

The production line has a cycle time of a few seconds. It is environmentally friendly since it can be compact in construction and has low energy and disposal costs.

The protective coating contains no heavy metals and, in particular, is free from chromium(VI) and from cadmium. The parameters (frequency, time and temperature) specific to the particular protective coating can be flexibly controlled. The protective coating applied to the bearing parts is electrically conductive, inorganic, highly resistant to damage in the salt spray test, the humidity test and the Kesternich test, heat resistant to 300° C., thin (5–15 $\mu$m) and has a cathodic action, i.e., scratches on the surface do not exhibit rust creep, and chemical or electrochemical corrosion (including contact corrosion, for example which might be caused by steel against aluminum) is avoided or reduced. Curing of the protective coating of the ready mounted roller bearings takes place only in the region close to their surfaces, so that there is no reduction in the component strength and no hydrogen embrittlement.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A process for protecting a roller bearing against corrosion, the process comprising:
    providing a heat curable, thin protective coating of either a powder coating material or a wet coating material on at east a portion of the bearing, the bearing having been machine finished and being provided with at least one of grease, seals, and installation in a surrounding part, and
    then inductively heating at least the area of the coated portion of the bearing for curing the coating material.

2. The process of claim 1, wherein the inductive heating and the resultant curing are performed generally at the surface of the bearing or part.

3. The process of claim 2, wherein the coated surfaces of the bearing are inductively heated to be at a temperature in the range of from 200° C. to 300° C.

4. The process of claim 2, wherein the inductive heating is conducted for a few seconds and the surfaces of the bearing are held at the inductive heating temperature.

5. The process of claim 1, wherein the coating is applied to have a final coated thickness in the range of about 5–30 $\mu$m.

6. The process of claim 5, wherein the protective coating is of an inorganic material having a cathodic action.

7. The process of claim 6, wherein the coated surfaces of the bearing are inductively heated to be at a temperature in the range of from 200° C. to 300° C.

8. The process of claim 1, wherein the protective coating is of an inorganic material having a cathodic action.

9. The process of claim 1, wherein the protective coating is a wet coating material based on inorganic substances and is electrically conductive.

10. The process of claim 1, wherein the inductive heating is conducted for a few seconds.

11. The process of claim 10, wherein the bearing is cooled after the protective coating has been applied.

12. The process of claim 1, wherein the bearing is cooled after the protective coating has been applied.

* * * * *